United States Patent
Alam (10) Patent No.: US 11,368,542 B2
(45) Date of Patent: Jun. 21, 2022

(54) LAST ACCESSED NETWORK INFORMATION BY TERMINATING WI-FI CALLING DEVICE

(71) Applicant: T-Mobile USA, Inc., Bellevue, WA (US)

(72) Inventor: Shaheed Alam, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/949,357

(22) Filed: Oct. 27, 2020

(65) Prior Publication Data

US 2021/0044667 A1 Feb. 11, 2021

Related U.S. Application Data

(62) Division of application No. 15/807,189, filed on Nov. 8, 2017, now Pat. No. 10,827,017.

(51) Int. Cl.
| | |
|---|---|
| *H04L 67/54* | (2022.01) |
| *G06F 9/54* | (2006.01) |
| *H04W 4/16* | (2009.01) |
| *H04L 65/1046* | (2022.01) |
| *H04L 65/1073* | (2022.01) |

(52) U.S. Cl.
CPC ............ *H04L 67/24* (2013.01); *G06F 9/547* (2013.01); *H04L 65/1046* (2013.01); *H04L 65/1073* (2013.01); *H04W 4/16* (2013.01)

(58) Field of Classification Search
CPC .................... G06Q 30/0259; H04W 12/06
USPC .................................. 370/331, 329; 455/437
See application file for complete search history.

(56) References Cited

U.S. PATENT DOCUMENTS

| | | | |
|---|---|---|---|
| 8,644,833 B1 | 2/2014 | Manning et al. | |
| 2004/0233840 A1 | 11/2004 | Bye | |
| 2006/0146803 A1 | 7/2006 | Bae et al. | |
| 2007/0297373 A1* | 12/2007 | Saifullah | H04W 48/18 370/338 |
| 2008/0304458 A1 | 12/2008 | Aghvami et al. | |
| 2015/0319660 A1* | 11/2015 | Helbert | H04W 4/80 455/436 |
| 2016/0021579 A1 | 1/2016 | Mufti | |
| 2016/0165518 A1 | 6/2016 | Keller et al. | |

(Continued)

FOREIGN PATENT DOCUMENTS

EP 2603040 6/2013

OTHER PUBLICATIONS

3GPP, "3rd Generation Partnership Project; Technical Specification Group Services and System Aspects; IP Multimedia Subsystem (IMS); Stage 2 (Release 15)," 3GPP TS 23.228 V15.0.0 (Sep. 2017) Technical Specification, 328 pages.

(Continued)

*Primary Examiner* — Kiet M Doan
(74) *Attorney, Agent, or Firm* — Lee & Hayes, P.C.

(57) ABSTRACT

The systems, devices, and methods discussed herein are directed to a Wi-Fi calling (WFC) portable communication device, or a user equipment (UE), for providing information regarding a cellular network that a terminating WFC UE has last accessed. In response to receiving a call in a wireless local area network (WLAN), the terminating WFC UE transmits the information regarding the last accessed cellular network, such as radio access technology and radio cell identity to a service provider.

20 Claims, 5 Drawing Sheets

(56) References Cited

U.S. PATENT DOCUMENTS

2018/0049209 A1  2/2018 Hu et al.
2019/0141149 A1  5/2019 Alam

OTHER PUBLICATIONS

Office Action for U.S. Appl. No. 15/807,189, dated Mar. 12, 2020, Alam, "Last Accessed Network Information By Terminating Wi-Fi Calling Device", 9 Pages.
Non Final Office Action dated Mar. 19, 2019 for U.S. Appl. No. 15/807,189 "Last Accessed Network Information By Terminating Wi-Fi Calling Device" Alam, 9 pages.
Office Action for U.S. Appl. No. 15/807,189, dated Dec. 4, 2019, Alam, "Last Accessed Network Information By Terminating Wi-Fi Calling Device", 9 Pages.
Office Action for U.S. Appl. No. 15/807,189, dated Jul. 3, 2019, Alam, "Last Accessed Network Information By Terminating Wi-Fi Calling Device", 10 pages.
European Search Report and Written Opinion dated Nov. 13, 2020 for European Patent Application No. 18846978.7, 11 pages.

\* cited by examiner

LAST ACCESSED NETWORK INFORMATION BY TERMINATING WI-FI CALLING DEVICE

CROSS-REFERENCE TO RELATED APPLICATION

This application is a divisional of and claims priority to U.S. application Ser. No. 15/807,189, filed on Nov. 8, 2017 and entitled "Last Accessed Network Information By Terminating Wi-Fi Calling Device," the entirety of which is incorporated herein by reference.

BACKGROUND

Modern telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. The 5G telecommunication technologies are the next generation mobile networks that are designed to combine both an evolution and revolution of the existing LTE/LTE-A mobile networks to provide a much higher connectivity, greater throughput, much lower latency, and ultra-high reliability to support new use cases and applications.

In addition, a new generation of portable communication devices, or user equipment (UE), are capable of making phone calls over a wireless local area network (WLAN), referred as Wi-Fi™ calling or WFC. To be able to make or receive a call through a WLAN, the UE first registers its Internet Protocol (IP) address with the WLAN. When the UE makes a Wi-Fi call (the UE is now an originating WFC UE), information regarding a last accessed cellular network by the originating WFC UE is provided to a service provider. However, when the UE receives a Wi-Fi call (the UE is now a terminating WFC UE), the terminating WFC UE does not provide the information regarding its last accessed cellular network to the service provider.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The systems, devices, and methods discussed herein are directed to a Wi-Fi calling (WFC) portable communication device, or a user equipment (UE), for providing information regarding a last accessed network, such as radio access technology, radio cell identity, and location of a cellular network that the WFC UE had accessed, to a service provider upon receiving a call in a wireless local area network (WLAN). For example, the WFC UE may receive a SIP INVITE message while registered in the WLAN, and in response, may send a 183 message, which includes the information regarding the last cellular network that the WFC UE had accessed, to the service provider, or a mobile network owner (MNO) of the WFC UE.

The MNO may collect last accessed network information from a plurality of WFC UEs, both originating WFC UEs and terminating WFC UEs, group the WFC UEs based on network identities included in the last accessed network information, calculate a number of WFC UEs for each network identity, and analyze the performance of each network based, at least in part, on the number of the WFC UEs. The performance analyzed may include key performance indicators, such as a UE-originated call success rate, a drop call rate, registrations success rate, and the like.

The systems, devices, and methods described herein can be implemented in a number of ways. Example implementations are provided below with reference to the following figures.

Figure 1:
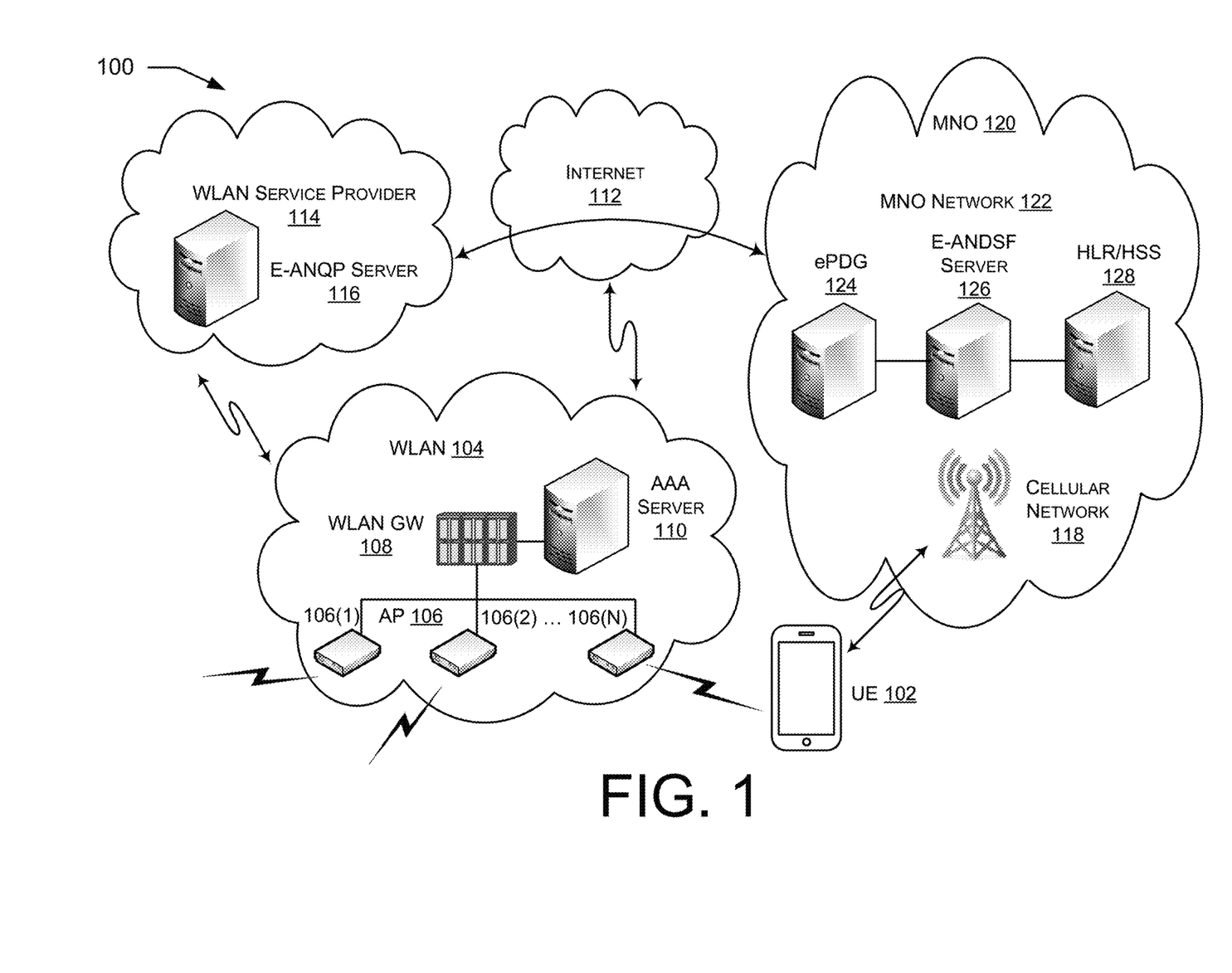
FIG. 1 illustrates an example environment in which a portable communication device, or user equipment (UE), accesses services via a wireless local area network (WLAN).

FIG. 1 illustrates an example environment 100 in which a portable communication device, or user equipment (UE), 102 accesses services via a wireless local area network (WLAN) 104.

The UE 102 may be implemented as any suitable mobile computing devices configured to communicate over a wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. In this sense, the terms "communication device," "wireless device," "mobile device," "computing device," and "user equipment" may be used interchangeably herein to describe any communication device capable of performing the techniques described herein. Furthermore, the UE 102, as well as the trusted and untrusted Radio Access Networks (RANs), may be capable of communicating over wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology.

The WLAN 104 comprises N access points (AP) 106 of which three (106(1), 106(2), and 106(N)) are shown, a WLAN gateway (GW) 108 communicatively coupled to the AP 106, and an authentication, authorization, accounting (AAA) server 110 communicatively coupled to the WLAN GW 108. The AP 106 is a transceiver that connects a WLAN device, such as the UE 102, to the WLAN. The WLAN GW 108 routes data packets from the AP 106 to other network and vice versa. The AAA server 110 tracks user activities by authenticating the user with unique identifying information, authorizing the user to access the network and services, and accounting, or tracking, the activities of the user. The AAA server 110 may be connected other servers via Internet 112. The WLAN 104 is communicatively coupled to a WLAN service provider 114 which provides services accessible through APs 106 to devices registered with the WLAN 104. The WLAN service provider 114 comprises an enhanced access network quality protocol (E-ANQP) server 116, which WLAN devices, such as the UE 102, use to perform network discovery. The UE 102 is capable of establishing communication with a WLAN, such as the WLAN 104, and with a cellular network, such as a cellular network 118, which may be a network of a mobile network operator (MNO) 120 of the UE 102, MNO network 122. The MNO network 122 comprises an evolved packet data gateway (ePDG) 124, an enhanced access network discovery and selection function (E-ANDSF) server 126, and a home location register/home subscriber server (HLR/HSS) 128. The ePDG 124 enables secure connection between the UE 102 and the MNO network 122. The E-ANDSF server 126 assists the UE 102 in discovering WLANs and provides the UE 102 with rules and policies for connecting to the WLANs. The HLR/HSS 128 stores and updates the user subscription information, and also generates security information.

As the UE 102 successfully registers with the WLAN 104, the UE 102 maintains information regarding the last cellular network it had accessed, such as the cellular network 118. The UE 102 may maintain the last accessed network information for a predetermined time period, two hours for example. When the UE 102 initiates a call through the WLAN 104, the UE 102 provides the last accessed network information as a part of the call initiation, for example, the last accessed network information may be included in a SIP INVITE message. When the UE 102 receives a call through the WLAN 104, for example, the UE 102 may receive a SIP INVITE message, then in response, UE 102 may send the last accessed network information, for example, in a 183 message, to the MNO 120.

Figure 2:
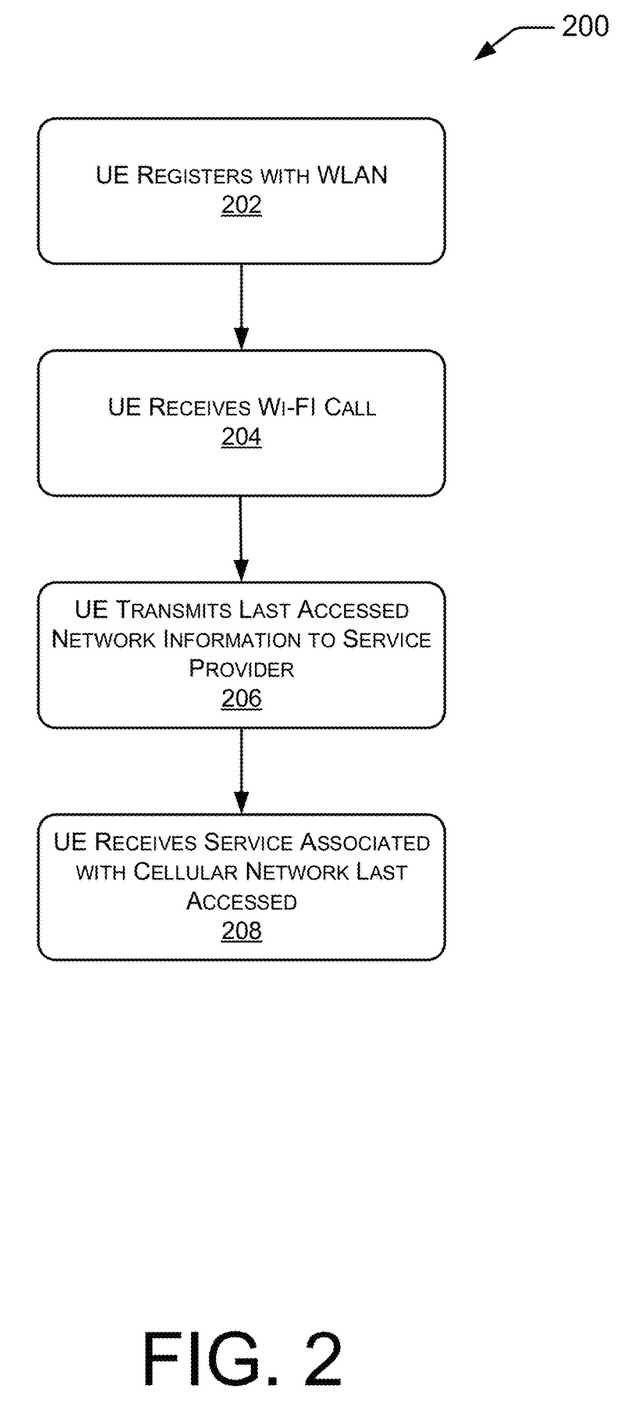
FIG. 2 illustrates an example process for the UE to provide last accessed network information to a service provider.

FIG. 2 illustrates an example process 200 for the UE 102 to provide last accessed network information to a service provider, such as the MNO 120.

In block 202, the UE 102 may register with a WLAN, such as the WLAN 104. In block 204, the UE 102 may receive a call through the WLAN 104, for example, the UE 102 may receive a SIP INVITE message. In response to receiving the SIP INVITE, the UE 102, in block 206, may transmit last accessed network information, such as information regarding the cellular network 118, to a service provider, such as the MNO 120. The UE 102 may transmit the last accessed network information included in a 183 message to the MNO 120 in response to receiving the SIP INVITE message. The UE 102 may transmit the last accessed network information to the MNO 120 while the call is being established.

The last accessed network information may include information, such as an identity, a location, and supported cellular technologies, associated with a cellular network, such as the cellular network 118, that the UE 102 had accessed immediately prior to registering with the WLAN 104.

The UE 102 may receive a service associated with the last accessed network information from the MNO 120, in block 208. The service associated with the last accessed network information may be based on a performance analysis of the cellular network 118 conducted by the MNO 120, and may be associated with a key performance indicator, such as a UE-originated call success rate, a drop call rate, or a registration success rate of the cellular network 118.

The UE 102 may maintain the last accessed network information for a predetermined period of time. For example, the cellular network associated with last accessed network information may be a cellular network that the UE 102 had accessed within the predetermined period of time, such as two hours, immediately prior to registering with the WLAN 104. If the UE 102 had not accessed a cellular network within the predetermined period of time prior to registering with the WLAN 104, then the last accessed network information may be set to a null value. For example, the UE 102 may be turned off and be turn back on after some period time in a WLAN only environment, and if the predetermined period of time were set to be two hours, and the UE 102 last accessed the cellular network three hours prior to registering with the WLAN 104, then the last accessed network information might be considered stale. The last accessed network information might then be deleted, be set to a null value, be kept but assigned a null value, or be kept but the UE 102 might refrain from sending it.

Figure 3:
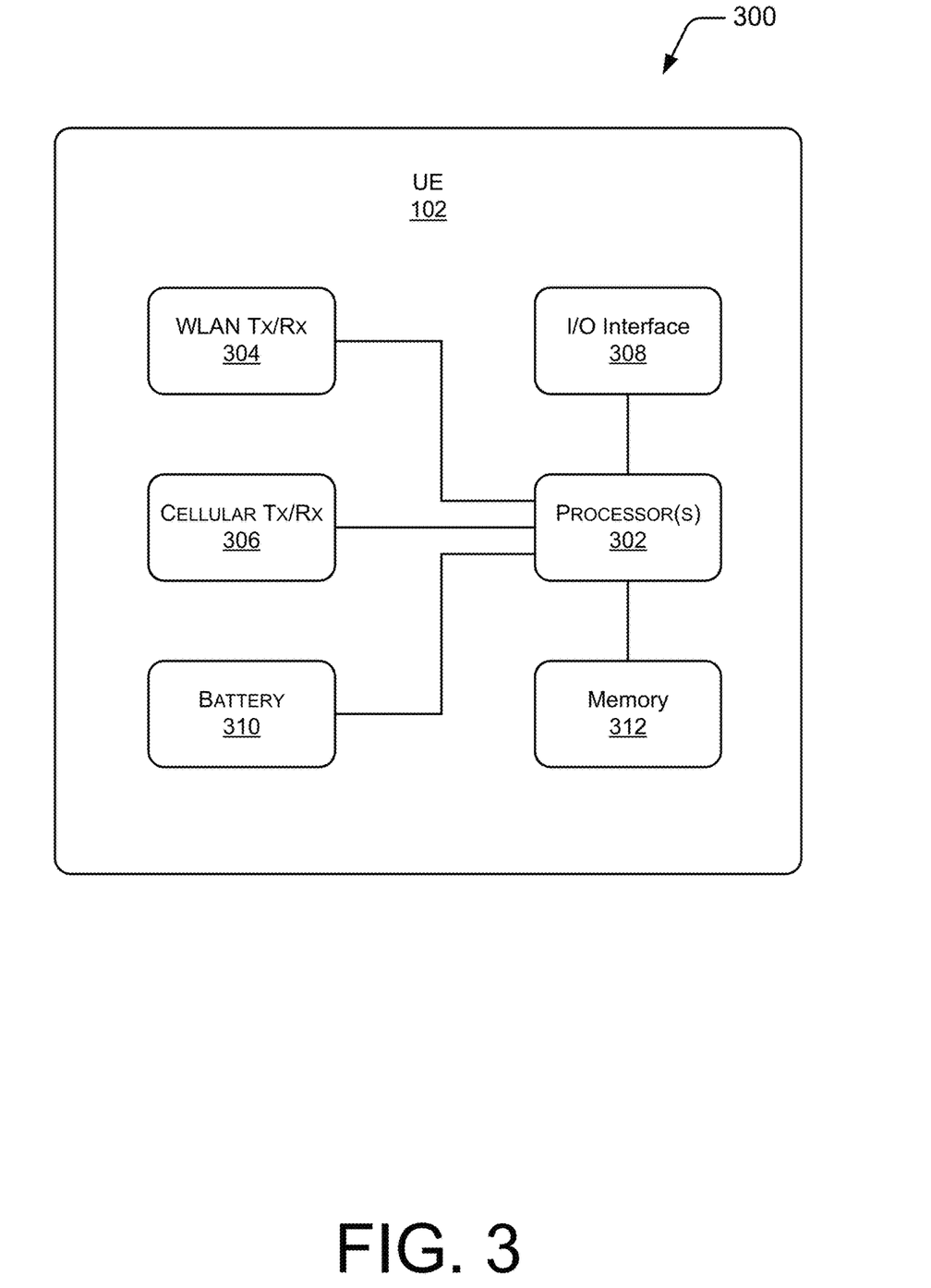
FIG. 3 illustrates an example block diagram of the UE.

FIG. 3 illustrates an example block diagram 300 of the UE 102. The UE 102 comprises one or more processors 302, a WLAN transceiver 304 communicatively coupled to the one or more processors 302, and a cellular transceiver 306. The one or more processors 302 may be directly or indirectly coupled to other components and/or modules of the UE 102. In some embodiments, the one or more processors 302 may be a central processing unit (CPU), a graphics processing unit (GPU), or both CPU and GPU, or other processing unit or component known in the art. The WLAN transceiver 304 may be configured to establish communication between the UE 102 and a WLAN, such as the WLAN 104 described above, using a WLAN specific communication method such as 802.11 family of standards and the like. The cellular transceiver 306 is configured to establish communication between the UE 102 and a cellular network, such as the cellular network 118 described above, using a cellular network specific communication method or standard such as GSM, UMTS, LTE, 5G standards and the like. The UE 102 further comprises an input/output (I/O) interface 308, a battery 310, and memory 312, each communicable coupled the one or more processors 302 and may be directly or indirectly coupled to other components and/or modules of the UE 102. The I/O interface 308 may include a keyboard, mouse, touch pad, touch screen, microphone, and the like, configured to receive an input from a user and may also include a speaker, display which may be a touchscreen, and the like, configured to provide an output for the user. The battery 310 may provide power to all components and modules of the UE 102 requiring power. Memory 312 may include volatile memory (such as random access memory (RAM)) and/or non-volatile memory (such as read-only memory (ROM), flash memory, etc.). Memory 312 may also include additional removable storage and/or non-removable storage including, but not limited to, flash memory, magnetic storage, optical storage, and/or tape storage that may provide non-volatile storage of computer-readable instructions, data structures, program modules, and other data for the UE 102.

Memory 312, a non-transitory computer storage medium, may store computer-readable instructions executable by the one or more processors 302, that when executed by the one or more processors 302, cause the one or more processors 302 to perform operations described above with referenced to FIG. 2. For example, the UE 102 may, via the WLAN transceiver 304, register with a WLAN, such as the WLAN 104, receive a call through the WLAN 104, and in response to receiving the call, transmitting last accessed network information of the UE 102 to the MNO 120. The last accessed network information may include information associated with a cellular network, such as the cellular network 118, that the UE 102 has last accessed via the cellular transceiver 306 prior to registering with the WLAN 104. The UE 102 may receive the call through the WLAN 104 by receiving a SIP INVITE message, and transmit the last accessed network information of the UE 102 by transmitting the last accessed network information in a SIP 183 message. The UE 102 may transmit the SIP 183 message including the last accessed network information while the call is being set up.

As discussed above with referenced to FIG. 2, the UE 102 may maintain the last accessed network information for a predetermined period of time. For example, the cellular network associated with last accessed network information may be a cellular network that the UE 102 had accessed within the predetermined period of time, such as two hours, immediately prior to registering with the WLAN 104. If the UE 102 had not accessed a cellular network within the predetermined period of time, then the last accessed network information may be set to a null value. For example, if the predetermined period of time were set to be two hours, and the UE 102 last accessed the cellular network three hours prior to registering with the WLAN 104, then the last accessed network information might be considered stale. The last accessed network information might then be deleted, be set to a null value, be kept but assigned a null value, or be kept but the UE 102 might refrain from sending it.

As discussed above with reference to FIG. 2, the information associated with the cellular network 118 that the UE 102 had last accessed may include an identity, a location, and supported cellular technologies of the cellular network 118. The UE 102 may receive a service associated with the last accessed network information from the MNO 120 based on analysis of key performance indicators of the cellular network 118 conducted by the MNO 120, and may be associated with a UE-originated call success rate, a drop call rate, and a registration success rate of the cellular network 118.

Figure 4:
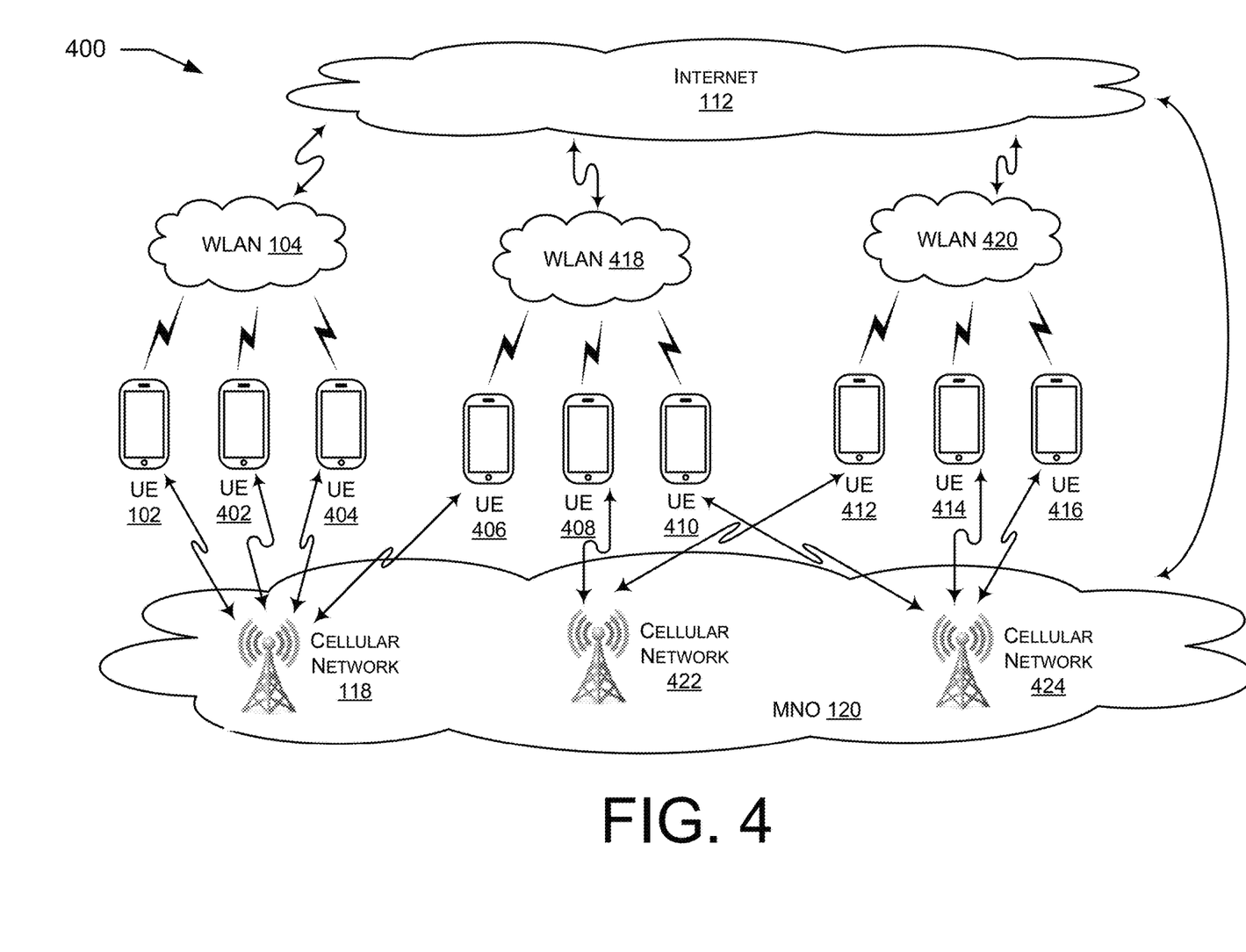
FIG. 4 illustrates an example environment in which multiple UEs access services via different WLANs.

FIG. 4 illustrates an example environment 400 in which multiple UEs access services via different WLANs. Similar to the environment discussed above with reference to FIG. 1, the example environment 400 illustrates UEs having accessed cellular networks prior to registering with WLANs, and each component illustrated in FIG. 4 may include components and functions as described above with reference to FIGS. 1 and 2.

Multiple UEs, of which three (UEs 102, 402, and 404) are shown, are registered with the WLAN 104, having accessed the cellular network 118 of the MNO 120 prior to registering with the WLAN 104. Similarly, two other sets of multiple UEs, of which three for each set (UEs 406, 408, and 410, and UEs 412, 414, and 416) are shown, are registered with WLANs 418 and 420, respectively, having accessed cellular networks 422 or 424 of the MNO 120 prior to registering with the WLANs 418 and 420. In this example, prior to registering with the WLAN 418, the UE 406 is illustrated to have accessed the cellular network 118, the UE 408 is illustrated to have accessed the cellular network 422, and the UE 410 is illustrated to have accessed the cellular network 424. The UE 412 is illustrated to have accessed the cellular network 422, and the UEs 414 and 416 are illustrated to have accessed the cellular network 424 prior to registering with the WLAN 420.

Figure 5:
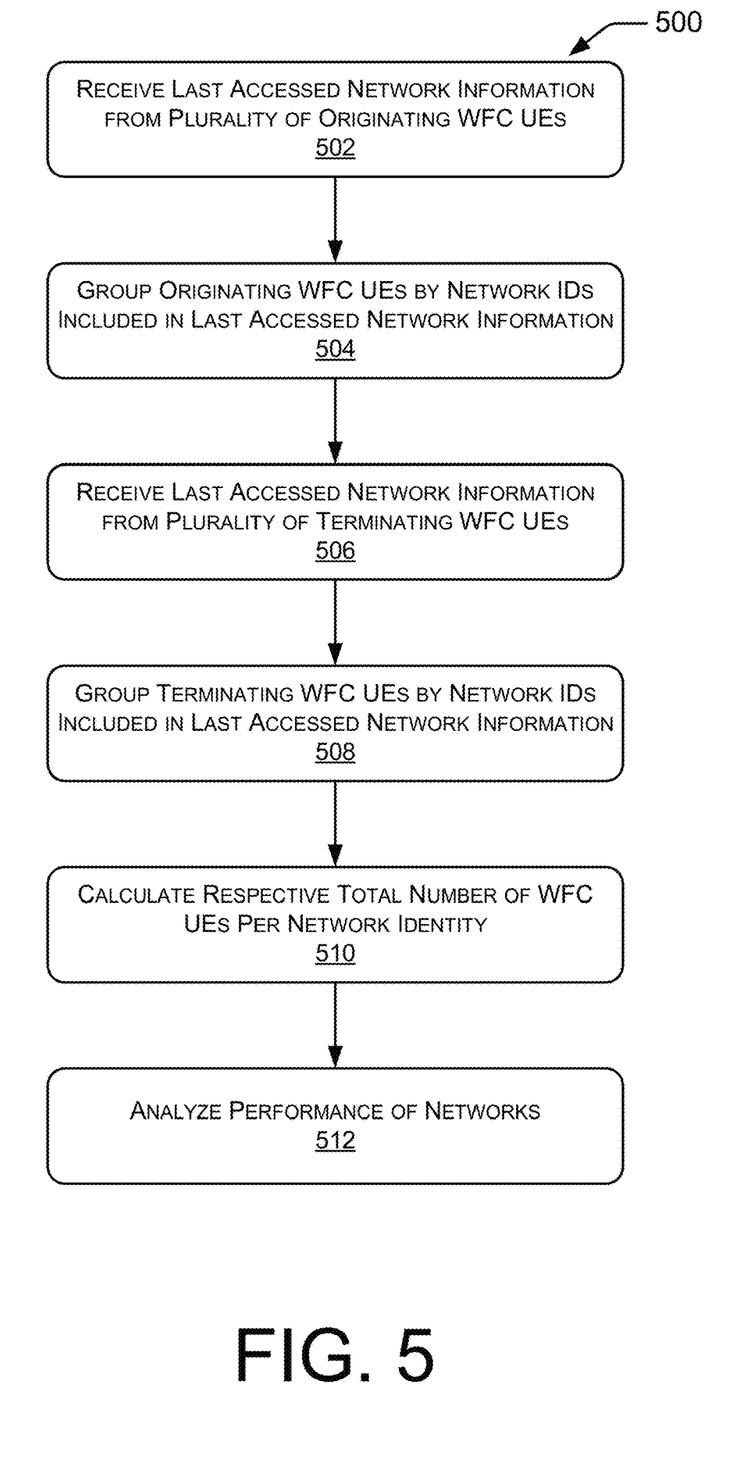
FIG. 5 illustrates an example process for a mobile network operator (MNO) to analyze network performance in the example environment of FIG. 4 based on the example process illustrated in FIG. 2.

FIG. 5 illustrates an example process 500 for the MNO 120 to analyze network performance in the example environment 400 based on the example process illustrated in FIG. 2.

In block 502, the MNO 120 may receive last accessed network information from a plurality of originating WFC UEs. For example, the UE 102 registered with the WLAN 104, the UEs 406 and 408 with registered with the WLAN 418, and the UE 412 registered with the WLAN 420 may initiate, or originate, calls via the respective WLANs, and may transmit the respective last accessed network information to the MNO 120. As discussed above with reference to FIGS. 2 and 3, last accessed network information may include an identity, a location, and supported cellular technologies of the cellular network last accessed by a UE prior to registering with a WLAN. The MNO 120 may receive the last accessed network information in SIP INVITE messages transmitted by the originating WFC UEs 102, 406, 408, and 412.

The MNO 120, at block 504, may group the originating WFC UEs based on network identities included in corresponding last accessed network information from the originating WFC UEs. In this example, the UEs 102 and 406 are grouped under the cellular network 118, the UE 408 is grouped under the cellular network 422, and the UE 412 is also grouped under the cellular network 422 based on network identities included in the respective last accessed network information.

In block 506, the MNO 120 may receive last accessed network information from a plurality of terminating WFC UEs. For example, the UEs 402 and 404 registered with the WLAN 104, the UE 410 with registered with the WLAN 418, and the UEs 414 and 416 registered with the WLAN 420 may receive calls via the respective WLANs, and may, in response to receiving the calls, transmit the respective last accessed network information to the MNO 120. The MNO 120 may receive the last accessed network information in SIP 183 messages transmitted by the terminating WFC UEs 402, 404, 410, 414, and 416 in response to the terminating WFC UEs 402, 404, 410, 414, and 416 receiving SIP INVITE messages.

The MNO 120, at block 508, may group the terminating WFC UEs based on network identities included in corresponding last accessed network information from the terminating WFC UEs. In this example, the UEs 402 and 404 are grouped under the cellular network 118, the UE 410 is grouped under the cellular network 424, and the UEs 414 and 416 are grouped also under the cellular network 424 based on network identities included in the respective last accessed network information.

In block 510, the MNO 120 may calculate a total number of WFC UEs per cellular network based on the network identity. In this example, there are four UEs (UEs 102, 402, 404, and 406) under the cellular network 118, two UEs (UEs 408 and 412) under the cellular network 422, and three UEs (UEs 410, 414, and 416) under the cellular network 424. The MNO 120, in block 512 may analyze performance of each cellular network based, at least in part, on the total number of WFC UEs associated with the network. The performance analyzed may include key performance indicators, such as a UE-originated call success rate, a drop call rate, or a registration success rate.

Alternatively, or additionally, after grouping the originating WFC UEs based on the network identities in block 504, the MNO 120 may calculate the total number of originating WFC UEs per cellular network based on the network identity, and analyze performance of each cellular network based, at least in part, on the total number of the originating WFC UEs associated with the network. The MNO 120 may also calculate the total number of terminating WFC UEs per cellular network based on the network identity after grouping the terminating WFC UEs based on network identities in block 508, and analyze performance of each cellular network based, at least in part, on the total number of the terminating WFC UEs associated with the network.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Memory 312, discussed above with referenced to FIG. 3, is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media does not include communication media.

The computer-executable instructions stored on one or more computer-readable storage media that, when executed by one or more processors, perform operations described above with reference to FIGS. 2, 3, and 5. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
  receiving last accessed network information from a plurality of originating Wi-Fi calling (WFC) user equipment (UEs);
  grouping the originating WFC UEs based on network identities included in corresponding last accessed network information from the plurality of originating WFC UEs;
  receiving last accessed network information from a plurality of terminating WFC UEs;
  grouping terminating WFC UEs based on network identities included in corresponding last accessed network information from the plurality of terminating WFC UEs;
  calculating a total number WFC UEs having a respective common network identity; and
  analyzing performance of a cellular network based, at least in part, on the total number of WFC UEs.

2. The method of claim 1, wherein receiving the last accessed network information from the plurality of originating WFC UEs comprises:
  receiving the last accessed network information in a SIP INVITE message transmitted by an originating WFC UE of the plurality of originating WFC UEs.

3. The method of claim 1, wherein receiving the last accessed network information from the plurality of terminating WFC UEs comprises:
  receiving the terminating last accessed network information in a SIP 183 message transmitted by a terminating WFC UE of the plurality of terminating WFC UEs in response to the terminating WFC UE receiving a SIP INVITE message.

4. The method of claim 1, wherein the network identity included in the last accessed network information is an identity of a cellular network that a WFC UE has last accessed prior to registering with a wireless local area network (WLAN), and wherein the last accessed network information further includes a location of the cellular network.

5. The method of claim 1, wherein analyzing the performance of the cellular network includes at least one of:
  a UE-originated call success rate,
  a drop call rate, or
  a registration success rate.

6. The method of claim 1, wherein at least one originating WFC UE and at least one terminating WFC UE are associated with the cellular network.

7. The method of claim 1, wherein the network identity included in the last accessed network information is an identity of a cellular network that a WFC UE has last accessed prior to registering with a wireless local area network (WLAN), and wherein the last accessed network information further includes information regarding cellular technologies supported by the cellular network.

8. A system comprising:
  one or more processors;
  one or more non-transitory computer-readable media storing computer-executable instructions, which when executed by the one or more processors cause the one or more processors to perform operations including:

receiving last accessed network information from a plurality of originating Wi-Fi calling (WFC) user equipment (UEs);

grouping the originating WFC UEs into a first set of UEs and a second set of UEs based on network identities included in corresponding last accessed network information from the plurality of originating WFC UEs;

receiving last accessed network information from a plurality of terminating WFC UEs;

grouping terminating WFC UEs into the first set of UEs or the second set of UEs based on network identities included in corresponding last accessed network information from the plurality of terminating WFC UEs; and analyzing performance of a first cellular network based, at least in part, on a total number of WFC UEs associated with the first set of UEs and performance of a second cellular network based, at least in part, on a total number of WFC UEs associated with eh second set of UEs.

9. The system of claim 8, wherein;
the network identity included in the last accessed network information is an identity of a cellular network that a WFC UE has last accessed prior to registering with a wireless local area network (WLAN); and
wherein the last accessed network information further includes:
a location of the cellular network; and
information regarding cellular technologies supported by the cellular network.

10. The system of claim 8, wherein a first WFC UE is grouped into the first set of UEs and the second set of UEs.

11. The system of claim 8, wherein analyzing the performance of the cellular network includes at least one of:
a UE-originated call success rate,
a drop call rate, or
a registration success rate.

12. The system of claim 8, wherein receiving the last accessed network information from the plurality of originating WFC UEs comprises receiving the last accessed network information in a SIP INVITE message transmitted by an originating WFC UE of the plurality of originating WFC UEs.

13. The system of claim 8, wherein receiving the last accessed network information from the plurality of originating WFC UEs comprises receiving the terminating last accessed network information in a SIP 183 message transmitted by a terminating WFC UE of the plurality of terminating WFC UEs in response to the terminating WFC UE receiving a SIP INVITE message.

14. The system of claim 8, wherein the operations further comprise:
calculating the first total number WFC UEs having a network identity associated with the first cellular network; and
calculating the second total number WFC UEs having a network identity associated with the second cellular network.

15. One or more non-transitory computer-readable media storing computer-executable instructions, which when executed by one or more processors cause the one or more processors to perform operations including:

receiving last accessed network information from a plurality of originating Wi-Fi calling (WFC) user equipment (UEs);

grouping the originating WFC UEs into a first set of UEs and a second set of UEs based on network identities included in corresponding last accessed network information from the plurality of originating WFC UEs;

receiving last accessed network information from a plurality of terminating WFC UEs;

grouping terminating WFC UEs into the first set of UEs or the second set of UEs based on network identities included in corresponding last accessed network information from the plurality of terminating WFC UEs; and analyzing performance of a first cellular network based, at least in part, on a total number of WFC UEs associated with the first set of UEs and performance of a second cellular network based, at least in part, on a total number of WFC UEs associated with eh second set of UEs.

16. The non-transitory computer-readable media of claim 15, wherein;
the network identity included in the last accessed network information is an identity of a cellular network that a WFC UE has last accessed prior to registering with a wireless local area network (WLAN); and
wherein the last accessed network information further includes:
a location of the cellular network; and
information regarding cellular technologies supported by the cellular network.

17. The non-transitory computer-readable media of claim 15, wherein a first WFC UE is grouped into the first set of UEs and the second set of UEs.

18. The non-transitory computer-readable media of claim 15, wherein receiving the last accessed network information from the plurality of originating WFC UEs comprises receiving the last accessed network information in a SIP INVITE message transmitted by an originating WFC UE of the plurality of originating WFC UEs.

19. The non-transitory computer-readable media of claim 15, wherein receiving the last accessed network information from the plurality of originating WFC UEs comprises receiving the terminating last accessed network information in a SIP 183 message transmitted by a terminating WFC UE of the plurality of terminating WFC UEs in response to the terminating WFC UE receiving a SIP INVITE message.

20. The non-transitory computer-readable media of claim 15, wherein the operations further comprise:
calculating the first total number WFC UEs having a network identity associated with the first cellular network; and
calculating the second total number WFC UEs having a network identity associated with the second cellular network.

* * * * *